United States Patent
King et al.

(10) Patent No.: US 9,550,434 B2
(45) Date of Patent: Jan. 24, 2017

(54) ENERGY MANAGEMENT SYSTEM AND METHOD FOR A VEHICLE

(71) Applicant: General Electric Company, Schenectady, NY (US)

(72) Inventors: Robert Dean King, Schenectady, NY (US); Funian Xiao, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/971,415

(22) Filed: Dec. 16, 2015

(65) Prior Publication Data
US 2016/0185249 A1 Jun. 30, 2016

Related U.S. Application Data

(60) Provisional application No. 62/098,862, filed on Dec. 31, 2014.

(51) Int. Cl.
*H02P 27/04* (2016.01)
*B60L 11/18* (2006.01)
*H02P 27/06* (2006.01)

(52) U.S. Cl.
CPC ........ *B60L 11/1868* (2013.01); *B60L 11/1803* (2013.01); *B60L 11/1861* (2013.01); *B60L 11/1872* (2013.01); *H02P 27/06* (2013.01)

(58) Field of Classification Search
CPC .......... H02J 7/00; H02J 7/0016; H02J 7/0021; H02P 27/04; H02P 27/06; B60L 11/1868; B60L 11/1803; B60L 11/1872; B60L 11/1861

USPC ......... 318/139, 400.01, 400.14, 400.15, 700, 318/701, 727, 430, 432, 722, 800, 801; 320/103, 106, 116, 124, 125, 127, 148, 320/149, 161; 363/40, 55, 95, 120, 174, 363/175

See application file for complete search history.

(56) References Cited

U.S. PATENT DOCUMENTS

| | | | |
|---|---|---|---|
| 7,053,588 B2 | 5/2006 | Nakanishi et al. | |
| 8,063,609 B2 * | 11/2011 | Salasoo | B60L 3/0046 320/103 |
| 8,148,952 B2 | 4/2012 | Schaffnit | |
| 9,174,525 B2 | 11/2015 | Caron | |
| 9,290,107 B2 * | 3/2016 | Shi | B60L 1/00 |
| 2013/0063072 A1 * | 3/2013 | Shirasaka | H01M 8/0488 320/101 |
| 2013/0138279 A1 * | 5/2013 | Shi | B60L 1/00 701/22 |

* cited by examiner

*Primary Examiner* — Antony M Paul
(74) *Attorney, Agent, or Firm* — John A. Kramer; Global Patent Operation

(57) ABSTRACT

The present invention relates to an energy management system including a motor, an inverter electrically connected to the motor, a DC-DC converter electrically connected to the inverter, a first energy storage unit electrically connected to a DC link of the inverter through the DC-DC converter, a second energy storage unit coupled to the inverter, and a control unit. The control unit is configured to control the distribution of electrical power from the first energy storage unit and the second energy storage unit to the inverter in dependence upon a predetermined power threshold.

19 Claims, 5 Drawing Sheets

ENERGY MANAGEMENT SYSTEM AND METHOD FOR A VEHICLE

CROSS-REFERENCE TO RELATED APPLICATIONS

This application claims the benefit of U.S. Provisional Application Ser. No. 62/098,862, filed on Dec. 31, 2014, which is herein incorporated by reference herein in its entirety.

FIELD OF THE INVENTION

Embodiments of the invention relate generally to electric vehicles. Other embodiments relate to an energy management system and method for an electric vehicle.

BACKGROUND OF THE INVENTION

Electric vehicles are known in the art and use one or more electric motors or traction motors for propulsion. (A traction motor is an electric motor that is used for propulsion of a vehicle.) Typically, electrical energy stored in on-board energy storage units, such as batteries and ultracapacitors, is fed to an inverter where direct current (DC) is converted to alternating current (AC), which is then fed to multi-phase (typically 3-phase) AC motors that drive the wheels of the vehicle. Electrical propulsion is designed and often used for urban package delivery vehicles (PDV), urban transit buses, and material transport vehicles, including underground mining vehicles, where emissions also must be kept to a minimum in the enclosed, underground spaces of the environment in which these vehicles operate. In connection with this, vehicles with electrical propulsion, as opposed to utilizing internal combustion engines, are often utilized to improve air quality, increase productivity, and reduce the cost of a mining operation, plus emissions for package delivery, and public transport in urban areas.

Thermal control of the energy storage units in underground mining electric vehicles is often challenging since the energy storage unit on-board the vehicle (e.g., the battery or ultracapacitor) is often required to operate over a specified temperature range. If, for example, the temperature is too high, the life of the battery or other energy storage unit can be significantly reduced. In addition, if the energy storage unit operates at significantly elevated temperatures, such thermal conditions may also lead to potential safety issues.

Conversely, depending on the particular battery technology and chemistry, if the operating temperature is too low, performance of the battery can degrade. Or, if for example, a high temperature battery such as a sodium metal halide chemistry battery is utilized, the battery may not function properly when the operating temperature range is below 250° C. In addition, operation at the low end of the operating temperature range can cause low efficiency and reduced power capability. Likewise, operation of the battery at elevated temperatures above prescribed temperature levels may shorten the battery's life, cause faults, and the like.

FIG. 1 illustrates a prior art propulsion system 10 for a vehicle. As shown therein, the system includes a single energy storage unit 12, an inverter 14, at least one motor 16 and a control unit 18 for controlling the distribution of electrical energy from the energy storage unit 12, as discussed in detail hereinafter. The storage unit 12 may be a battery having of a type and chemistry known in the art, and is configured to store electrical energy from an external power station, from stored electricity originally form an external power source, from an on-board electrical generator, or during capture of regenerative braking energy while the vehicle is decelerating or holding speed on a down-hill grade. The energy storage unit 12 is configured to feed stored electrical energy, where energy is defined as power for a specified time (i.e. Whr), in the form of DC current at a particular voltage, to the inverter 14, where it is converted to alternating current electrical excitation. From the inverter 14, the alternating current and voltage electrical excitation is fed to the motor 16 which drives the wheels of a vehicle 20 on which the system 10 is deployed. As will be readily appreciated, however, all of the power and energy for propelling the vehicle employing the propulsion system 10 must be provided by the single energy storage unit 12.

In view of the above, there is a need for an energy management system and method for electric vehicles that alleviates thermal issues related to battery operation.

BRIEF DESCRIPTION OF THE INVENTION

The present invention relates to an energy management system including a motor, an inverter electrically connected to the motor, a DC-DC converter electrically connected to the inverter, a first energy storage unit electrically connected to a DC link of the inverter through the DC-DC converter, a second energy storage unit coupled to the inverter, and a control unit. The control unit is configured to control the distribution of electrical power from the first energy storage unit and the second energy storage unit to the inverter in dependence upon a predetermined power threshold.

In another embodiment, a method for managing the distribution rate of electrical energy on an electric vehicle is provided. The method includes the steps of, in response to a total power demand, controlling a first energy storage unit to provide a first amount of electrical energy to a motor, the first amount of electrical energy being equal to or less than a predetermined power threshold, and controlling a second energy storage unit to provide a second amount of electrical energy to the motor, the second amount of electrical energy being the difference between the total power demand and the first amount of electrical energy provided to the motor by the first energy storage unit.

In another embodiment, a method of managing the distribution of electrical energy from an energy storage unit is provided. The method includes the steps of controlling a discharge rate of electrical energy from a first chemistry within the cells of the energy storage unit according to a first power split parameter, at a first determined characteristic, controlling the discharge rate of electrical energy from the first chemistry within the cells of the energy storage unit according to a second power split parameter, and, at a second determined characteristic, controlling the discharge rate of electrical energy from a second chemistry within the cells according to a third power split parameter.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
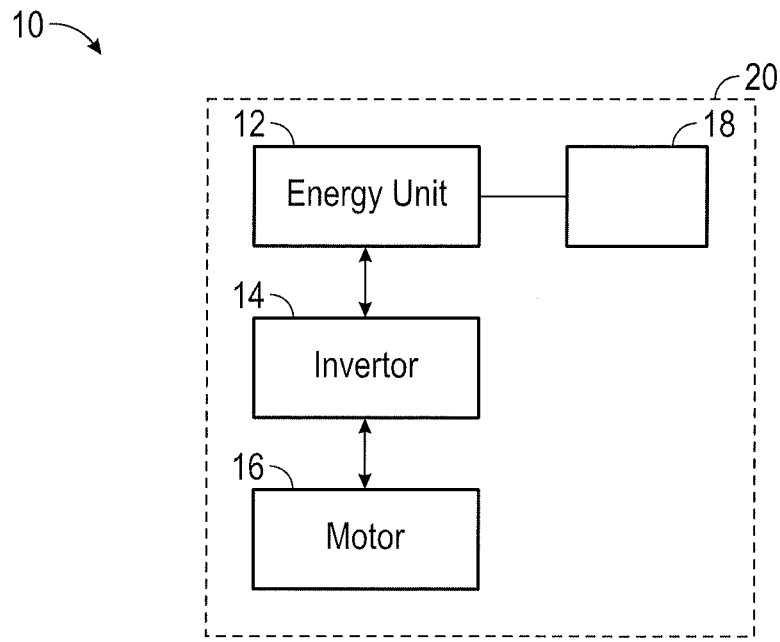
FIG. 1 is schematic illustration of a prior art propulsion system for a vehicle having a single energy storage unit.

Reference will be made below in detail to exemplary embodiments of the invention, examples of which are illustrated in the accompanying drawings. Wherever possible, the same reference numerals used throughout the drawings refer to the same or like parts. While the system and method of the present invention is described and illustrated in connection with underground material transport vehicles, the system and method of the present invention is applicable to electric vehicles and other electrical machinery, generally.

As used herein, "electrically connected" means that the referenced elements are directly or indirectly connected such that an electrical current may flow from one to the other. The connection may include a direct conductive connection (i.e., without an intervening capacitive, inductive or active element), an inductive connection, a capacitive connection, and/or any other suitable electrical connection. Intervening components may be present.

Figure 2:
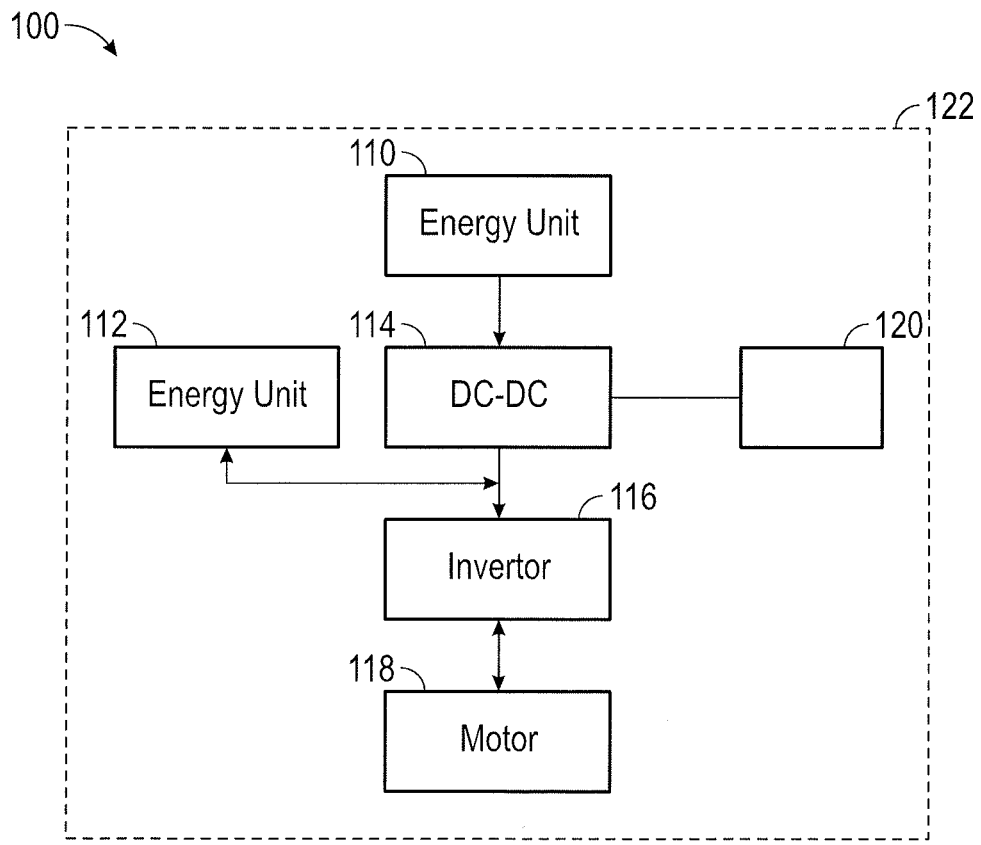
FIG. 2 is a schematic illustration of an energy management system utilizing a plurality of energy storage units, according to an embodiment of the present invention.

With reference to FIG. 2, an energy management system 100 according to an embodiment of the present invention in illustrated. As shown therein, the system includes a plurality of energy storage units, including a low-side energy storage unit 110 and a high-side energy storage unit 112, a DC-DC converter 114, an inverter 116 and at least one motor 118. The energy storage units 110, 112 may be any type of energy storage known in the art and can have any technology and chemistry known in the art. In an embodiment, the DC-DC converter 114 is a bi-directional boost converter. The low-side energy storage unit 110 is electrically coupled to the DC link of the inverter 116 through the DC-DC converter 114, while the high-side energy storage unit 112 is directly coupled to the DC link of the inverter 116. As will be readily appreciated, the inverter 116 converts direct current from the low-side energy storage unit 110 (via the converter 114) and from the high-side energy storage unit 112 to alternating current, which is fed to the motor 118. The motor 118 drives wheels of the vehicle 122 on which the system 100 is deployed, in order to propel the vehicle 122. As illustrated therein, the system 100 also includes a control unit 120 configured to control the distribution and utilization of electrical energy, as discussed in detail below.

Figure 3:
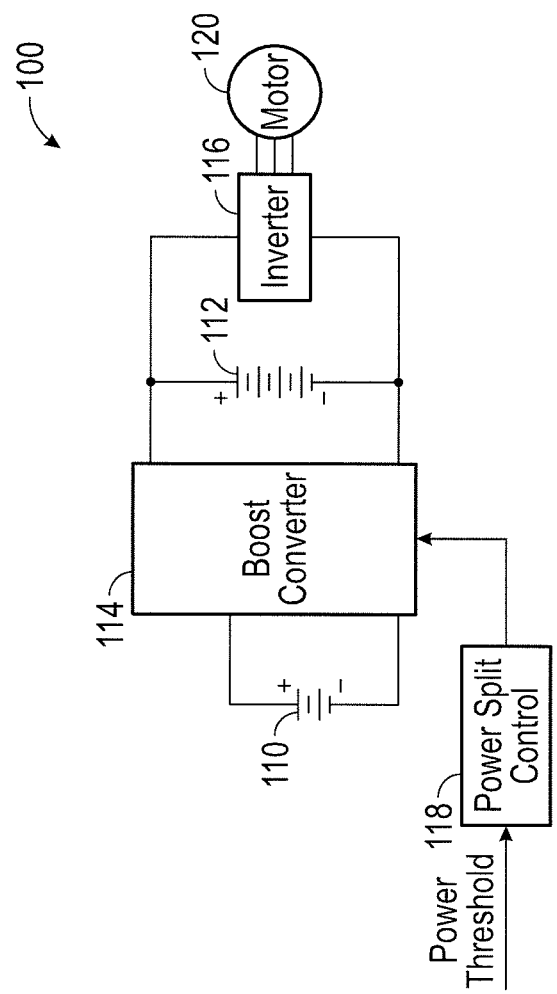
FIG. 3 is a circuit diagram illustrating the energy management system of FIG. 2.

FIG. 3 is a circuit diagram illustrating the interconnection of the components of the system 100 of FIG. 2 and, in particular, showing the high-side energy storage unit 112 directly coupled to the inverter 116 DC link and the low-side energy storage unit 110 electrically coupled to the inverter 116 DC link through the DC-DC converter 114. In an embodiment, the control unit 120 operates according to control algorithm stored in memory to provide a dynamic power split between the low-side energy storage unit 110 and high-side energy storage unit 112. In particular, the control unit 120 is configured to control electrical energy distribution from the low-side battery 110 and high-side battery 112 in dependence upon one or more battery characteristics including state of charge, internal resistance, and terminal voltage, and/or in dependence upon one or more vehicle operating parameters for the vehicle 122 on which the system 100 is deployed, including ambient temperature conditions, vehicle cooling system parameters and variations in vehicle load and duty cycle time duration.

In an embodiment, the control unit 120 is configured to control energy distribution to the inverter 116 in dependence upon a predetermined power threshold. For example, in an embodiment, a constant, preset/predetermined power threshold of 75 kW may be utilized. In an embodiment, when the load power is less than the 75 kW threshold, the control unit 120 may control the low-side energy storage unit 110 to supply electrical power to meet the total load power requirement. For load power greater than the predetermined threshold, the difference between the load power and threshold power may be supplied by the high-side energy storage unit 112. Accordingly, the control unit 120, in response to power demands during vehicle operation, controls the low-side energy storage unit 110 to supply electrical power up to a predetermined threshold, and controls the high-side energy storage unit 112 to provide supplemental power in excess of the predetermined threshold amount to meet the total power demand of the vehicle 122. As will be readily appreciated, by splitting the power requirement between the low-side energy storage unit 110 and high-side energy storage unit 112, thermal issues that may result from a single battery attempting to meet the total power demand of a vehicle are therefore obviated.

Figure 4:
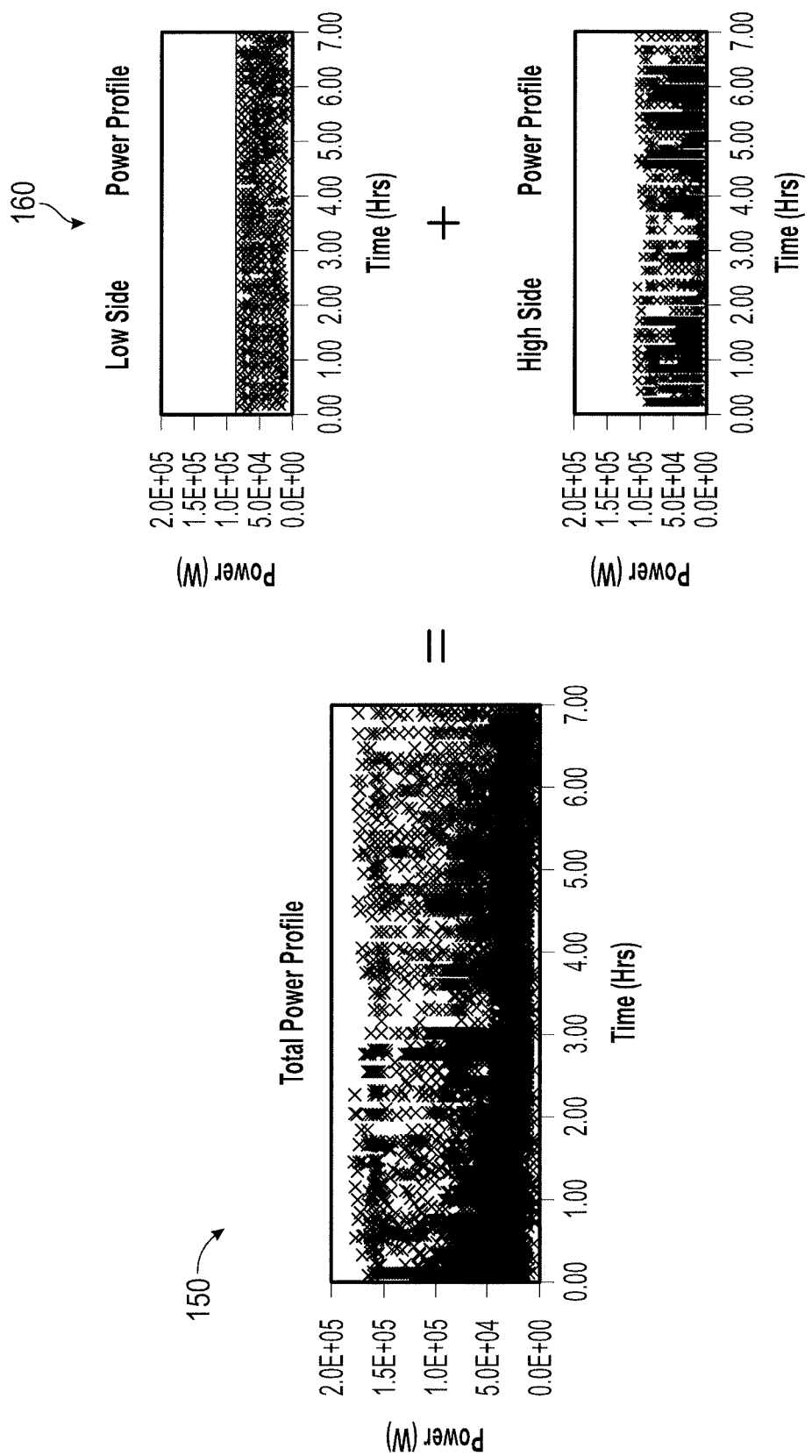
FIG. 4 is a diagram illustrating an exemplary power profile of an electric vehicle during a shift operation.

With reference to FIG. 4, an exemplary power profile of an underground material transport electric vehicle having a single energy storage unit, such as that shown in FIG. 1, during a shift operation, is shown on the left side thereof at 150. As shown therein, a single energy storage unit must meet the full power demand of the vehicle. Because the single storage unit must supply all of the power throughout an entire shift, the operating temperature of the energy storage unit/battery may be high for a portion of the entire shift time, resulting in potential longevity issues and the like. As illustrated on the right side of FIG. 4, an exemplary power profile for vehicle 122 having the system 100 illustrated in FIGS. 2 and 3 is shown at 160. As shown therein, while the total power demand for the vehicle 122 may be the same as for the single energy unit configuration shown in FIG. 1, the power demand may be split between the low-side energy storage unit 110 and the high-side energy unit 112 such that the peak level of electrical power supplied by any one of the units 110, 112 is substantially less than if a single energy storage unit were employed. As a result of the decreased peak power load, the operating temperatures of each battery 110, 112 may be lessened, prolonging battery life and increasing safety. That is, in the dual energy storage configuration illustrated in FIGS. 2 and 3, the power requirement can be split and dynamically controlled between multiple, or as described in this embodiment, two energy storage units 110, 112, in order to solve energy storage thermal issues.

Figure 5:
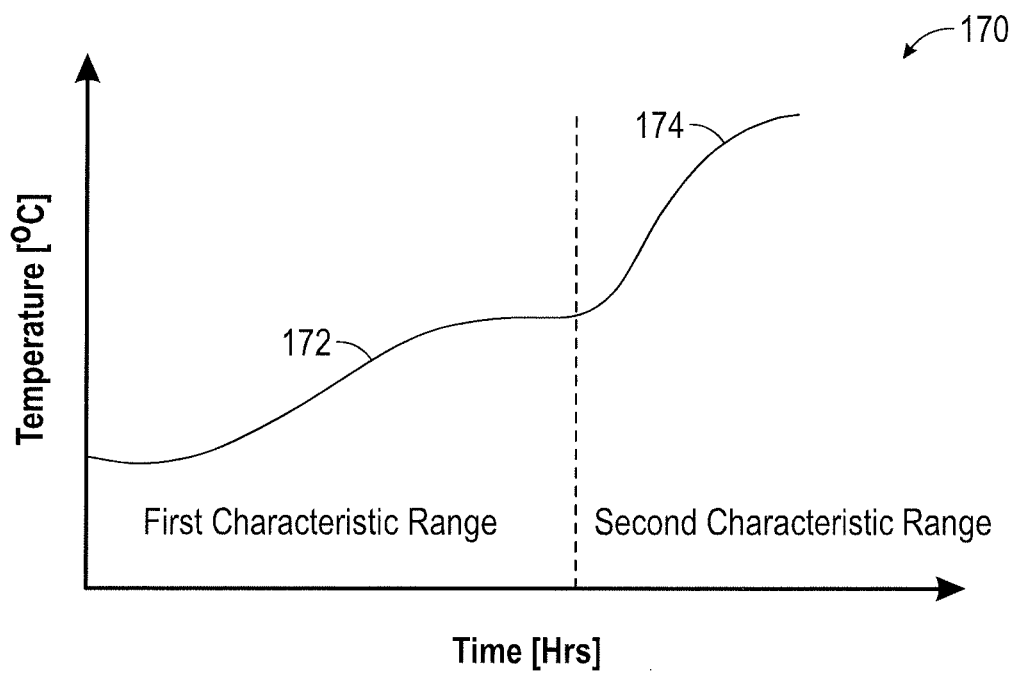
FIG. 5 is a graph illustrating an exemplary energy storage temperature profile over a desired discharge range for an electric vehicle.

FIG. 5 shows a typical energy storage temperature profile 170 over a desired discharge range for an electric material handler vehicle. As shown therein, the energy storage unit/battery temperature increases consistently, but with different slopes. Depending on the battery and associated system parameters and characteristics, including state of charge, cell temperature, thermal mass, ambient temperature, energy storage cooling system effectiveness, chemical components, and load power and duty cycle requirements, there are different temperature slopes 172, 174 that correspond to the temperature rise rates. For example, if one of the multiple energy storage units is comprised of battery cells containing two different chemistries, e.g., a high temperature sodium-metal halide battery, there are two temperature rise rates. In an embodiment, a dynamic control algorithm can be implemented by the control unit 120 to minimize the temperature of the respective energy storage unit or battery in the multi-energy configuration as described above.

In another embodiment, the control unit 120 is configured to operate according to a control algorithm with a multiple segment control strategy that is used to solve the battery thermal issues. As will be readily appreciated, during the high power demand portion of the load profile, the temperature rise rate for the respective batteries is also higher. In an embodiment, the control unit 120 is configured to provide more electrical energy from the low-side energy storage unit/battery 110, compared with high-side energy storage unit/battery 112, when the temperature rate of rise for the low-side battery 110 is lower. Moreover, the control unit 120 is configured to adjust the power requirement/power threshold for the low-side battery 110 when the temperature rate of rise in the low-side battery 110 is higher, and to then control the high-side battery to supply a longer portion of the remaining power requirement for the vehicle 122. This control strategy with various segments can maintain lower temperature rise for the low-side battery 110 when the low-side battery experiences rapid temperature rise.

Figure 6:
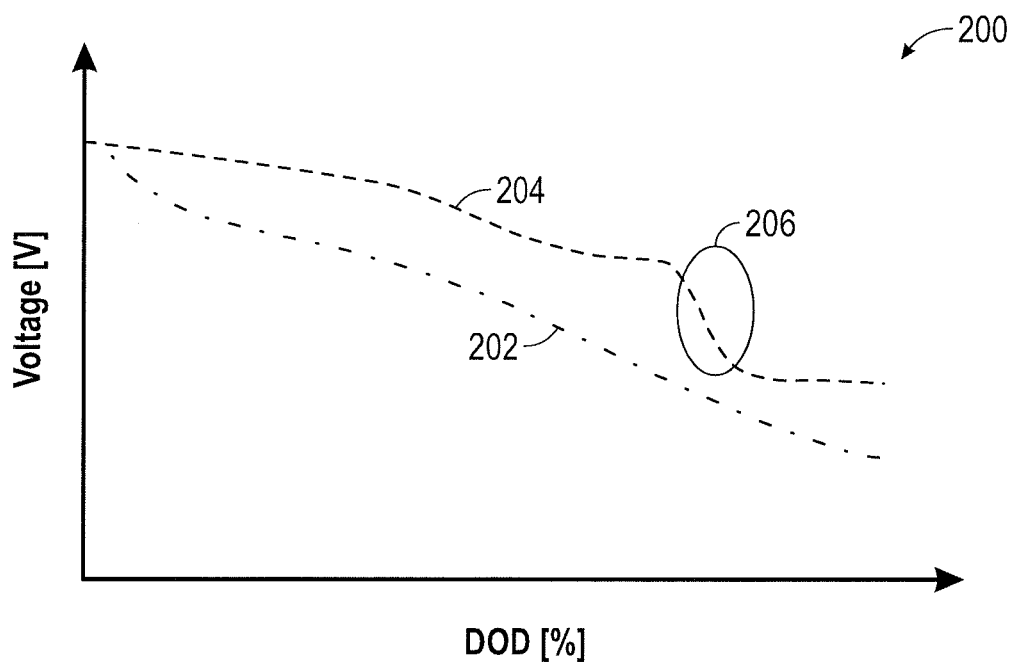
FIG. 6 is a DC voltage diagram for a propulsion system for a vehicle having a single energy storage unit, such as that illustrated in FIG. 1.

Turning now to FIG. 6, an exemplary DC battery voltage diagram 200. For a system having a single energy storage unit, such as that of FIG. 1, the DC battery voltage as shown corresponds to the DC link voltage. Dashed line 202 illustrates the depth of discharge of a battery cell with a single chemistry, while dashed line 204 illustrates the depth of discharge of a battery cell with two chemistries. As shown therein, as the battery state of charge decreases, the battery depth of discharge increases, and the DC link voltage also decreases. For batteries with single chemistry, the battery DC link voltage is monotonically decreasing smoothly when state of charge decreases or the depth of discharge increases, as denoted by line 202. But the smooth or consistent decreasing voltage cannot be found in batteries with two or more chemistries since the different chemistries have different open-circuit voltages.

As used herein, a battery with two or more chemistries means a battery with two or more chemistries within the cells of the battery. In particular, unlike conventional batteries, batteries with two or more chemistries (e.g., sodium-metal-halide batteries) have a feature that, during the initial portion of discharge, one (first) chemistry is utilized and after a certain designed discharge capacity, the second chemistry is utilized. While discharging using the first chemistry within the cell, the cell has a higher open circuit voltage than when discharging using the second chemistry within the cell. This multiple chemistry within the cell also gives the sodium-metal-halide cell the unique property that during a cell failure, the chemistry provides a low impedance or essentially an "electrical short circuit", which allows current to flow through the failed cell with low impedance. In most other batteries, failure of an individual cell typically fails in a high impedance or electrically "open circuit".

With further reference to FIG. 6, in a battery with two or more chemistries, the DC battery voltage transitions to a lower voltage level when the battery cells transition from the first chemistry to the second chemistry, as shown at 206. With the system of FIG. 1, having a single energy storage unit 12 with two chemistries within the cells, the chemistry with higher open-circuit voltage will be discharged initially, and then the chemistry with lower open-circuit voltage will be discharged. Therefore, after the battery is discharged to the certain state of charge value, the discharge voltage will be significantly reduced to the lower level. The multiple segments dynamic control strategy implemented by the control unit 120 can delay this downward transition in DC link voltage depending on a set of the power split parameters. Besides this benefit, the additional benefit for control of the DC link voltage using circuit concepts described in FIG. 2 and FIG. 3 is that the multiple segment control strategy tends to maintain the DC link voltage at a higher level than the simple fixed power split threshold. In addition, the higher DC link voltage will reduce power and energy loss from several other components in the system, including batteries, power electronic inverter(s) and electric motor(s), thus increasing system efficiency that ultimately results in increased range per charge and therefore increased productivity.

In an embodiment, the discharge of electrical energy from a battery and, in particular, from the first and second chemistries of the battery, are controlled in dependence upon determined characteristics of the first and second chemistries within the battery. The determined characteristics may include a state of charge and/or a depth of discharge of the first chemistry, as well as a state of charge and or a depth of discharge of the second chemistry.

Figure 7:
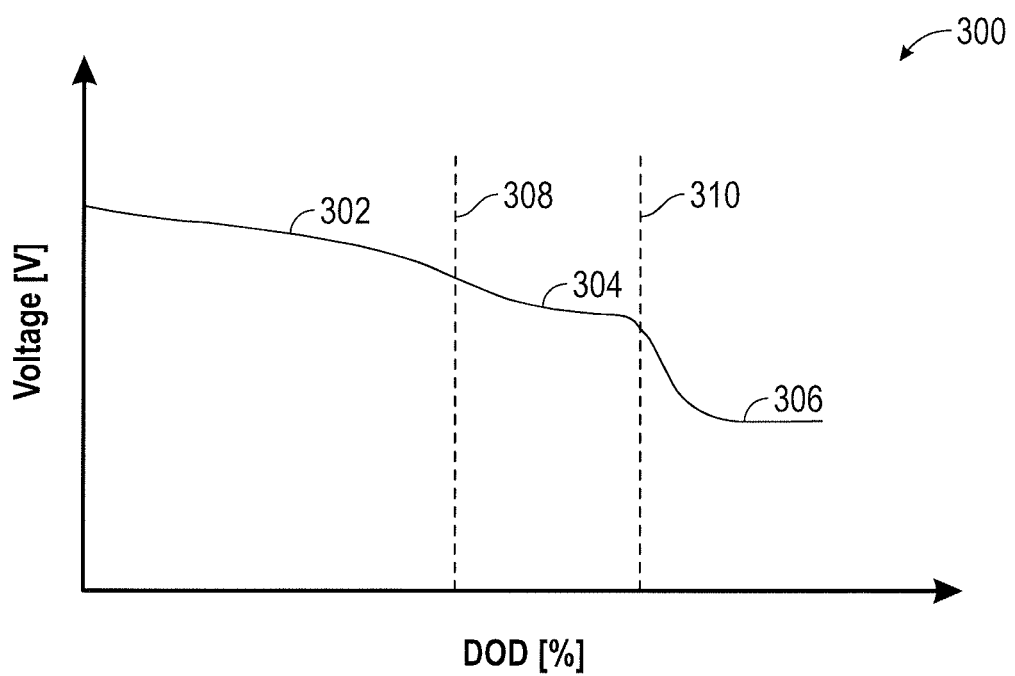
FIG. 7 is a DC voltage diagram for a propulsion system having a high-temperature sodium metal halide battery.

FIG. 7 shows a DC voltage diagram 300 for a multiple-chemistry battery and, in particular, a high temperature sodium metal halide battery with a three segment dynamic control strategy that includes three power split parameters and two state of charge split parameters resulting in thermal and voltage conditions to maintain battery cells within the proper operating temperature range, in accordance with an embodiment of the present invention. The three segments including the three power split parameters are illustrated at 302, 304 and 306, and the two state of charge split parameters at 308, 310. As an example, a high specific energy battery, i.e. a low-side battery, using two different chemistries within its cells, is utilized. Key parameters include three power split parameters and two state of charge split parameters, where depth of discharge is equal to one minus state of charge. As illustrated in FIG. 7, two of three power split parameters are used for controlling the first chemical discharging, shown at 302 and 304 and the third power split parameter is used for controlling the second chemical discharging, shown at 306. Two state of charge split parameters are used for switching the power split parameter from one to another when the battery is discharged to the certain state of charge, as illustrated at 308 and 310. In an embodiment, these parameters can be customized and can be used to dynamically control the power split, which will improve the thermal condition of the battery. A significant benefit of this multiple segment dynamic control strategy through operation at increased DC link voltage is to prevent high temperatures within the battery cells, reduce the losses in the power electronic inverter(s), and lower losses in the motor, thus improving system efficiency As will be readily appreciated, the system and method of the present invention provides for increased battery life as a result of resolving battery thermal issues, increased peak power performance and increased operation time and productivity. In addition, by decreasing the battery operating temperature the system of the present invention is safer than conventional systems. Moreover, by addressing the battery thermal issues through a dynamic control strategy, overdesign of the battery cooling system is eliminated and redesign of the thermal insulation to limit the temperature rise is no longer necessary.

In connection with the above, the multiple segment control strategy implemented by the control unit allows the electric powered material transport vehicle to continually work throughout the shift or mission without any stop or requirement for a special cooling. As discussed above, this provides for longer duration shifts, thus resulting in increased productivity, an increase in useable energy from the electric propulsion battery system, reduced energy losses in other system components, such as the electric motor and traction inverter, and improved electric motor peak power performance as a result of the increased level of DC link voltage level over a longer operation time.

Thus, the systems and methods described herein provide for energy management on an electric vehicle. In one embodiment, an energy management system includes a motor, an inverter electrically connected to the motor, a DC-DC converter electrically connected to the inverter, a first energy storage unit electrically connected to a DC link of the inverter through the DC-DC converter, a second energy storage unit coupled to the inverter, and a control unit. The control unit is configured to control the distribution of electrical power from the first energy storage unit and the second energy storage unit to the inverter in dependence upon a predetermined power threshold.

In an embodiment, the control unit is configured to control the first energy storage unit to provide a first amount of power, wherein the first amount of power being less than or equal to the power threshold. The control unit is configured to control the second energy storage unit to provide a second amount of power, the second amount of power being the difference between a total amount of power requested and the power threshold.

In an embodiment, the system is deployed on an underground material transport vehicle.

In an embodiment, at least one of the first energy storage unit and the second energy storage unit is a sodium metal-halide battery.

In an embodiment, the control unit is configured to control the distribution of electrical power from the first energy storage unit and the second energy storage unit in dependence upon one or more energy storage unit characteristics including state of charge, internal resistance and terminal voltage.

In an embodiment, the control unit is configured to adjust the power threshold in dependence upon a temperature rise rate of the first energy storage unit. In an embodiment, the control unit is configured to lower the power threshold when the temperature rise rate of the first energy storage unit exceeds a predetermined temperature rise rate.

In an embodiment, the control unit is configured to adjust the power threshold in response to a detected state of charge of the first energy storage unit.

In another embodiment, a method for managing the distribution of electrical energy on an electric vehicle is provided. The method includes the steps of, in response to a total power demand, controlling a first energy storage unit to provide a first amount of electrical energy to a motor, the first amount of electrical energy being equal to or less than a predetermined power threshold, and controlling a second energy storage unit to provide a second amount of electrical energy to the motor, the second amount of electrical energy being the difference between the total power demand and the first amount of electrical energy provided to the motor by the first energy storage unit.

The method may also include the step of adjusting the predetermined power threshold in response to a detected temperature rate rise of the first energy storage unit.

In an embodiment, the electric vehicle is an underground material transport vehicle.

In an embodiment, at least one of the first energy storage unit and the second energy storage unit is a sodium metal-halide battery.

In an embodiment, the method may also include the step of adjusting the predetermined power threshold in response to a detected state of charge of the first energy storage unit. In an embodiment, adjusting the predetermined power threshold includes lowering the threshold amount when the temperature rate rise of the first energy storage unit exceeds a rate threshold.

In another embodiment, a method of managing the distribution of electrical energy from an energy storage unit is provided. The method includes the steps of controlling a discharge of electrical energy from a first chemistry within the cells of the energy storage unit according to a first power split parameter, at a first characteristic, controlling the discharge of electrical energy from the first chemistry within the cells of the energy storage unit according to a second power split parameter, and, at a second characteristic, controlling the discharge of electrical energy from a second chemistry within the cells according to a third power split parameter.

In an embodiment, the first characteristic is a first determined state of charge of the first chemistry within the cell. In an embodiment, the second characteristic is a second determined state of charge of the first chemistry within the cell.

In an embodiment, the first characteristic is a first determined depth of discharge of the first chemistry within the cell. In an embodiment, the second characteristic is a second determined depth of discharge of the first chemistry within the cell.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the energy management system and method for a vehicle without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An energy management system, comprising:
   a motor;
   an inverter electrically connected to the motor;
   a DC-DC converter electrically connected to the inverter;
   a first energy storage unit electrically connected to a DC link of the inverter through the DC-DC converter;
   a second energy storage unit coupled to the inverter; and
   a control unit configured to control the distribution of electrical power from the first energy storage unit and the second energy storage unit to the inverter in dependence upon a predetermined power threshold and the control unit is configured to control the first energy storage unit to provide a first amount of power, the first amount of power being less than or equal to the power threshold and to control the second energy storage unit to provide a second amount of power, the second amount of power being the difference between a total amount of power requested and the power threshold.

2. The energy management system of claim 1, wherein:
   the system is deployed on one of an underground material transport vehicle, a package delivery vehicle (PDV), or an urban transit bus.

3. The energy management system of claim 1, wherein:
   at least one of the first energy storage unit or the second energy storage unit is a sodium metal-halide battery.

4. The energy management system of claim 1, wherein:
   the control unit is configured to control the distribution of electrical power from the first energy storage unit and the second energy storage unit in dependence upon one or more energy storage unit characteristics including state of charge, internal resistance, and terminal voltage.

5. The energy management system of claim 1, wherein:
   the control unit is configured to adjust the power threshold in dependence upon a temperature rise rate of the first energy storage unit.

6. The energy management system of claim 5, wherein:
   the control unit is configured to lower the power threshold when the temperature rise rate of the first energy storage unit exceeds a predetermined temperature rise rate.

7. The energy management system of claim 1, wherein:
   the control unit is configured to adjust the power threshold in response to a detected state of charge of the first energy storage unit.

8. A method for managing the distribution rate of electrical energy on an electric vehicle, comprising the steps of:
   in response to a total power demand, controlling a first energy storage unit to provide a first amount of electrical energy to a motor, the first amount of electrical energy being equal to or less than a predetermined power threshold; and
   controlling a second energy storage unit to provide a second amount of electrical energy to the motor, the second amount of electrical energy being the difference between the total power demand and the first amount of electrical energy provided to the motor by the first energy storage unit.

9. The method according to claim 8, further comprising the step of:
   adjusting the predetermined power threshold in response to a detected temperature rate rise of the first energy storage unit.

10. The method according to claim 9, wherein:
    adjusting the predetermined power threshold includes lowering the threshold amount when the temperature rate rise of the first energy storage unit exceeds a rate threshold.

11. The method according to claim 8, wherein:
    the electric vehicle is an underground material transport vehicle.

12. The method according to claim 8, wherein:
    at least one of the first energy storage unit or the second energy storage unit is a sodium metal-halide battery.

13. The method according to claim 8, further comprising the step of:
    adjusting the predetermined power threshold in response to a detected state of charge of the first energy storage unit.

14. A method of managing the distribution rate of electrical energy from an energy storage unit, the method comprising the steps of:
    controlling a discharge of electrical energy from a cell operating using a first chemistry of the energy storage unit according to a first power split parameter;
    at a first determined characteristic, controlling the discharge of electrical energy from the cell operating with a second chemistry of the energy storage unit according to a second power split parameter; and
    at a second determined characteristic, controlling the discharge of electrical energy from the cell operating with the second chemistry according to a third power split parameter.

15. The method according to claim 14, wherein:
    the first characteristic is a first determined state of charge of the first chemistry cell.

16. The method according to claim 15, wherein:
    the second characteristic is a second determined state of charge of the first chemistry cell operating with the first chemistry.

17. The method according to claim 16, wherein:
the second determined characteristic is a second determined depth of discharge of the cell operating with the first chemistry.
18. The method according to claim 14, wherein:
the first characteristic is a first determined depth of discharge of the first chemistry cell.
19. The method according to claim 14, wherein:
the energy storage unit is a sodium metal-halide battery.

* * * * *